US009086053B2

(12) United States Patent
Herrig et al.

(10) Patent No.: US 9,086,053 B2
(45) Date of Patent: Jul. 21, 2015

(54) ENHANCED WIND TURBINE BLADE

(75) Inventors: Andreas Herrig, Rheine (DE); Anurag Gupta, Houston, TX (US)

(73) Assignee: General Electric Company, Niskayuna, NY (US)

( * ) Notice: Subject to any disclaimer, the term of this patent is extended or adjusted under 35 U.S.C. 154(b) by 632 days.

(21) Appl. No.: 13/436,730

(22) Filed: Mar. 30, 2012

(65) Prior Publication Data
US 2013/0259697 A1 Oct. 3, 2013

(51) Int. Cl.
*F03D 1/06* (2006.01)
(52) U.S. Cl.
CPC ............. *F03D 1/0633* (2013.01); *Y02E 10/721* (2013.01)
(58) Field of Classification Search
CPC ..................... F03D 1/0633; Y02E 10/721
USPC ........ 416/223 R, 228, 235, 236 R, 237, 236 A
See application file for complete search history.

(56) References Cited

U.S. PATENT DOCUMENTS

| | | | | |
|---|---|---|---|---|
| 1,422,109 | A * | 7/1922 | Lambert | 416/235 |
| 3,117,630 | A * | 1/1964 | Barish | 416/88 |
| 4,382,569 | A * | 5/1983 | Boppe et al. | 244/199.4 |
| 4,544,281 | A * | 10/1985 | Wilkinson | 416/210 R |
| 5,102,068 | A * | 4/1992 | Gratzer | 244/35 R |
| 6,260,809 | B1 * | 7/2001 | Egolf et al. | 244/198 |
| 7,566,203 | B2 * | 7/2009 | Moser | 416/235 |
| 7,644,892 | B1 * | 1/2010 | Alford et al. | 244/199.4 |
| 7,946,826 | B1 | 5/2011 | Koegler et al. | |
| 7,997,875 | B2 | 8/2011 | Nanukuttan et al. | |
| 8,029,241 | B2 | 10/2011 | McGrath et al. | |
| 2009/0256029 | A1 | 10/2009 | Malachowski et al. | |
| 2010/0135806 | A1 * | 6/2010 | Benito | 416/147 |
| 2010/0213721 | A1 | 8/2010 | Hayashi et al. | |
| 2011/0024573 | A1 * | 2/2011 | Kirk et al. | 244/199.4 |
| 2011/0243736 | A1 | 10/2011 | Bell | |

OTHER PUBLICATIONS

Rinaldo Gonzalez Galdamez et al., "Design Optimization of Winglets for Wind Turbine Rotor Blades", Florida International unversity, pp. 1-118, Nov. 18, 2011.
Grasso et al., "Development and Validation of Generalized Lifting Line Based Code for Wind Turbine Aerodynamics", Energy Research Centre of Netherlands, pp. 1-21, Jan. 2011.
Ramesh et al., "Pavan", Centre for Wind Energy Technology, Issue-14, pp. 1-10, Jul.-Sep. 2007.
Jeppe Johansen et al., "Aerodynamic investigation of Winglets on Wind Turbine Blades using CFD", Risø National Laboratory, pp. 1-17, Feb. 2006.
Ian Kroo et al., "Highly Nonplanar Lifting Systems", Transportation Beyond 2000: Technologies Needed for Engineering Design, pp. 1-40, Sep. 26-28, 1995.

* cited by examiner

*Primary Examiner* — Igor Kershteyn
(74) *Attorney, Agent, or Firm* — Ann M. Agosti

(57) ABSTRACT

A wind turbine blade includes a root portion, a tip and a body extending between the root portion and the tip. The body has a pressure side and a suction side. The body further has at least one winglet. Each winglet has a spanwise extension towards the root portion of the rotor blade and that ends at the tip to form a winglet having a substantially C-shaped or substantially open P-shaped geometry.

22 Claims, 2 Drawing Sheets

ENHANCED WIND TURBINE BLADE

BACKGROUND

The subject matter of this disclosure relates generally to wind turbine blades, and more particularly to a compact curled winglet structure for a wind turbine blade.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size, configuration and capacity of wind turbines. One such modification has been to include a wingtip device, such as a winglet, at the tip of each wind turbine rotor blade. Generally, winglets can be employed to improve the overall efficiency and performance of a wind turbine. For example, a winglet may decrease the amount of spanwise flow generated at the tip of a rotor blade and, thereby, reduce drag on the rotor blade. Winglets may also be installed on rotor blades to reduce the overall diameter of the wind turbine as well as to reduce noise emitted by the blades. Further, winglets may also provide an increase in the power coefficient of a wind turbine and, thus, reduce the cost of energy generated by the wind turbine.

Several technologies have been employed in the past to reduce the tip vortex penalty on wind turbine blade performance with winglets being the most common passive concept. Winglets primarily rely on suppressing vortex formation to improve the lifting performance of the outboard section and mimicking an enlarged span. These winglets however have associated weight, drag/thrust and load penalties that result in the cost of energy (CoE) impact being significantly smaller than the annual energy production (AEP) gain they achieve. Further, since winglets are passive devices, they can only be tuned for one operating condition and will work sub-optimally at other conditions.

Modern wind turbine blades that employ winglets traditionally use L-shaped pressure side and/or suction side winglet structures. Suction side L-shaped winglet structures for wind turbine blades run into tower-strike margin issues that limit their size and effectiveness in enhancing aero performance. Pressure side L-shaped winglet structures for wind turbine blades are generally less effective.

In view of the foregoing, there is a need for a wind turbine blade winglet structure that overcomes the foregoing disadvantages to provide more optimal aerodynamic shapes. The improved wind turbine blade winglet structure should reduce tip vortex losses responsible for induced drag and thrust loads in the outboard section of the wind turbine blade.

BRIEF DESCRIPTION

An exemplary wind turbine blade according to one embodiment comprises a root portion, a tip, and a body extending between the root portion and the tip. The body includes a pressure side and a suction side. Additionally, a winglet may be defined by the body. The winglet may include a spanwise extension from the tip towards the center of rotation to form a C-shape in a direction of the pressure side of the body. The C-shape may be smoothly curved, boxy planar (with a kink), or a combination thereof.

According to another aspect, the present subject matter discloses a wind turbine. The wind turbine may include a tower and a nacelle mounted atop the tower. A rotor may be coupled to the nacelle and may include a hub. The wind turbine may also include at least one rotor blade extending from the hub. The rotor blade may define a pressure side or suction side winglet extending spanwise from its tip towards the center or rotation to form a C-shape that may be smoothly curved, boxy planar, or a combination thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DRAWINGS

The foregoing and other features, aspects and advantages of the invention are apparent from the following detailed description taken in conjunction with the accompanying drawings in which like characters represent like parts throughout the drawings, wherein.

Figure 1:
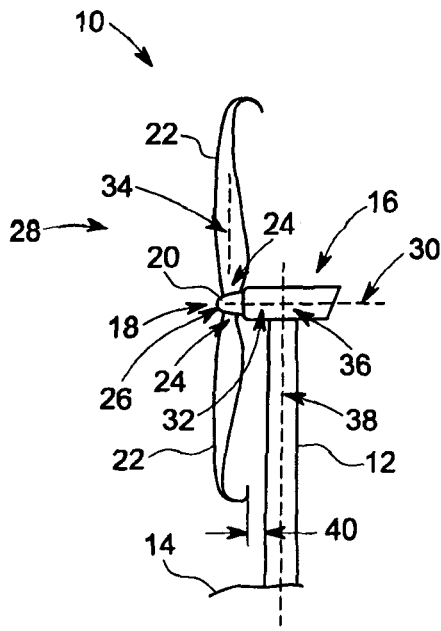
FIG. 1 illustrates a wind turbine that employs rotor blades according to aspects of the present subject matter.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10. As shown, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outward from the hub 20. As shown, the rotor 18 includes two rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. In an alternative embodiment, the tower 12 may be any suitable type of tower having any suitable height.

The rotor blades 22 may generally be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the rotor blades 22 may be mated to the hub 20 by coupling a blade root portion 24 to the hub 20 at a plurality of load transfer regions 26. Thus, any loads induced to the rotor blades 22 are transferred to the hub 20 via the load transfer regions 26.

As shown in the illustrated embodiment, the wind turbine 10 may also include a turbine control system or turbine controller 36 centralized within the nacelle 16. However, it should be appreciated that the turbine controller 36 may be disposed at any location on or in the wind turbine 10, at any location on the support surface 14 or generally at any other location. The controller 36 may be configured to control the various operating modes of the wind turbine 10 (e.g., start-up or shut-down sequences). Additionally, the controller 36 may be configured to control a pitch angle or blade pitch of each of the rotor blades 22 (i.e., an angle that determines a perspective of the rotor blades 22 with respect to the direction of the wind) to control the load and power generated by the wind turbine 10 by adjusting an angular position of at least one rotor blade 22 relative to the wind. For instance, the controller 36 may control the blade pitch of the rotor blades 22, either individually or simultaneously, by controlling a pitch adjustment system 32. Pitch axes 34 for the rotor blades 22 are shown. Further, as the direction of the wind changes, the controller 36 may be configured to control a yaw direction of the nacelle 16 about a yaw axis or the center line 38 of the tower 12 to position the rotor blades 22 with respect to the direction of the wind. For example, the controller 36 may control a yaw drive mechanism (not illustrated) of the nacelle in order to rotate the nacelle 16 about the tower center line 38.

During operation of the wind turbine 10, wind strikes the rotor blades 22 from a direction 28, which causes the rotor 18 to rotate about an axis of rotation 30. As the rotor blades 22 are rotated and subjected to centrifugal forces, the rotor blades 22 are also subjected to various forces and bending moments. Thus, the rotor blades 22 may deflect from a neutral or non-deflected position to a deflected or loaded position, thereby reducing the tower clearance between the blade 22 and the tower 12. In order to monitor the position of the blades 22 and reduce the likelihood of a tower strike, a predetermined tower clearance threshold 40 may be established. Thus, if one or more of the blades 22 deflect beyond this tower clearance threshold 40, a corrective action, such as adjusting the pitch of the blades 22 or altering the tilt angle of the nacelle 16, may be taken to increase the spacing between the tower 12 and the blade(s) 22 (or in blade design stage, the addition of more material in the spar caps, causing higher costs, or thicker airfoils having less aerodynamic performance). As used herein, the term "tower clearance threshold" generally corresponds to the minimum distance from the tower 12 at which the rotor blades 22 are maintained during operation of the wind turbine 10 so as to reduce the likelihood of a tower strike. Thus, it should be appreciated that the tower clearance 40 threshold may vary from wind turbine to wind turbine depending on, for example, the length of the rotor blades, the flexibility/rigidity of the rotor blades and/or the anticipated operating conditions of the wind turbine.

Figure 2:
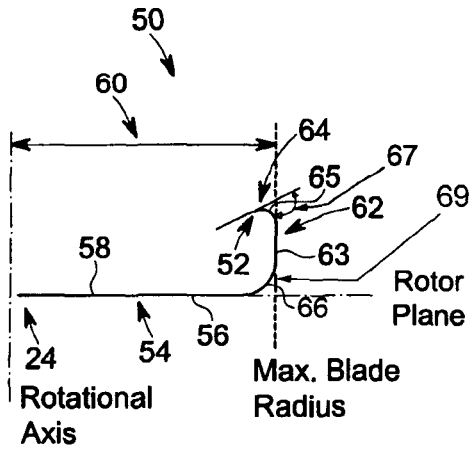
FIG. 2 illustrates a side view of one embodiment of a wind turbine rotor blade in accordance with aspects of the present subject matter.

Referring now to FIG. 2, there is illustrated a side view of one embodiment of a rotor blade 50 for a wind turbine 10. As shown, the rotor blade 50 includes a root portion 24 for mounting the blade 50 to the hub 20 of the rotor 18 (FIG. 1). The rotor blade 50 also includes a tip 52 disposed at an end of the blade 50 opposite the root portion 24. A body 54 of the rotor blade 50 generally extends between the root portion 24 and the blade tip 52 and defines a pressure side 56 and a suction side 58 of the rotor blade 50. Additionally, the body 54 may generally define a substantially aerodynamic profile to enable the blade 50 to capture kinetic energy from the wind using known airfoil principles.

FIG. 2 also illustrates a blade length 60 of the rotor blade 50. Generally, the blade length 60 may be defined in a longitudinal direction (i.e. a direction parallel to the center line 38 of the tower 12) between the interface of the root portion 24 and the hub 20 and the point on the blade 50 furthest from the axis of rotation 30 of the blade 50. As such, the interface of the rotor blade 50 and the hub 24 may define a 0% blade length and the outermost point of the blade 50 may define a 100% blade length. It should be appreciated that the rotor blade 50 may generally have any suitable blade length 60. For example, in one embodiment, the rotor blade 50 may have a length ranging from about 15 meters to about 91 meters, such as from about 20 meters to about 85 meters or from about 40 meters to about 55 meters and all other subranges therebetween. However, other non-limiting examples may include blade lengths of less than 15 meters or lengths greater than 91 meters.

Still referring to FIG. 2, the body 54 of the rotor blade 50 may also define a suction side winglet 62 terminating at the tip 52 of the blade 50. As indicated herein, a suction side winglet may provide numerous performance advantages for a wind turbine 10 including, but not limited to, a reduction in drag, noise and wind turbine diameter, as well as an increase in power coefficient. Generally, the suction side winglet 62 may extend spanwise towards the center of rotation 30 to form a C-shape or open P-shape structure 64. The C/open P-shape structure can be smoothly curved, boxy planar or combinations thereof, as described herein.

As illustrated in FIG. 2, suction side winglet 62 has a bathtub shape structure including a substantially flat portion 63, and a pair of curved portions 65, 66. Curved portion 65 extends spanwise towards the center of rotation 30, while curved portion 66 extends toward the suction side of the rotor blade 50. Curved portion 65 can be defined in terms of its cant angle 67. The vertical dashed line 69 depicted in FIG. 2 is the tangent to the winglet 62 at the maximum blade radius shown in FIG. 2 and is perpendicular to the rotor plane also illustrated in FIG. 2. Preferably, the winglet 62 has an overhang back toward the rotation axis in which the cant angle 67 exceeds zero degrees, e.g. approximately 10-20 degrees, up to about 180 degrees in the asymptotic extreme case of an open-P shape winglet. More specifically, the tip 52 is inclined inboard from the vertical 69. According to one embodiment, the tip 52 is pointing in the opposite direction of the blade, and can also be bent further towards the blade (with the P-shape marking the reasonable limit of the bend).

The orientation of the lift in the spanwise extension/backwards curved section 65 is such that it counteracts the lift direction on the main rotor blade 50. The resulting reduction in out-of-plane thrust can advantageously be used to reduce structural weight of the blade 50. Additionally, the particular size and shape of the winglet 62 may generally vary depending on, for example, the size and shape of the rotor blade 50, the anticipated operating conditions of the wind turbine 10 and the desired performance of the wind turbine 10. Thus, it should be appreciated that the suction side winglet of the present subject matter may generally be configured as any C-shape or substantially open P-shape wingtip structure for improving the aerodynamic efficiency and other performance-related parameters of an airfoil shaped body.

Since the out-of-plane height projection of the winglet 62 is reduced, the predetermined tower clearance threshold 40 for the wind turbine 10 is more easily maintained which improves the situation with respect to tower-strike/tip clearance issues for the case of a suction side winglet. Thus, the rotor blade 50 of the present subject matter may be provided with the numerous performance advantages associated with a suction side winglet 62 without increasing the likelihood that the rotor blade(s) 50 will strike the tower 10 during operation of the wind turbine 10.

Figure 3:
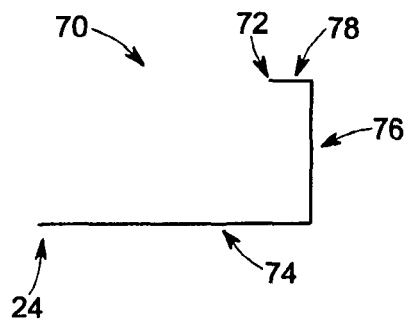
FIG. 3 illustrates a side view of another embodiment of a wind turbine rotor blade in accordance with aspects of the present subject matter.

Referring now to FIG. 3, another embodiment of a rotor blade 70 is illustrated in accordance with aspects of the present subject matter. As shown, the rotor blade 70 includes a root portion 24, a tip 72 and a body 74 extending between the root portion 24 and the tip 72. The body 74 of the rotor blade 70 may also define a suction side winglet 76 terminating at the tip 72 of the blade 70. As indicated herein, a suction side winglet may provide numerous performance advantages for a wind turbine 10 including, but not limited to, a reduction in drag, noise and wind turbine diameter, as well as an increase in power coefficient. Generally, the tip 72 of the suction side winglet 76 extends spanwise towards the center of rotation to form a boxy planar C-shape winglet structure 76. The orientation of the lift in the spanwise extension/backwards planar section 78 is such that it counteracts the lift direction on the main rotor blade 70. The resulting reduction in out-of-plane thrust can advantageously be used to reduce structural weight of the blade 70, as stated herein. Additionally, the particular size and shape of the winglet 76 may generally vary depending on, for example, the size and shape of the rotor blade 70, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 76 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 70 of the present subject matter may be provided with the numerous performance advantages associated with a suction side winglet 76 without increasing the likelihood that the rotor blade(s) 70 will strike the tower 10 during operation of the wind turbine 10.

Figure 4:
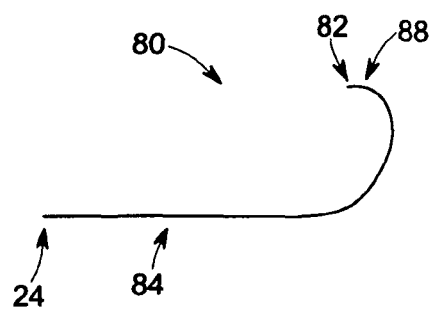
FIG. 4 illustrates a side view of yet another embodiment of a wind turbine rotor blade for a wind turbine in accordance with aspects of the present subject matter.

Referring now to FIG. 4, another embodiment of a rotor blade 80 is illustrated in accordance with aspects of the present subject matter. As shown, the rotor blade 80 includes a root portion 24, a tip 82 and a body 84 extending between the root portion 24 and the tip 82. The body 84 of the rotor blade 80 may also define a suction side winglet 86 terminating at the tip 82 of the blade 80. Generally, the tip 82 of the suction side winglet 86 extends spanwise towards the center of rotation to form a curvy C-shape winglet structure 86. The orientation of the lift in the spanwise extension/backwards section 88 is such that it counteracts the lift direction on the main rotor blade 80. The resulting reduction in out-of-plane thrust can advantageously be used to reduce structural weight of the blade 80, as stated herein. Additionally, the particular size and shape of the winglet 86 may generally vary depending on, for example, the size and shape of the rotor blade 80, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 86 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 80 of the present subject matter may be provided with the numerous performance advantages associated with a suction side winglet without increasing the likelihood that the rotor blade(s) 80 will strike the tower 10 during operation of the wind turbine 10.

Figure 5:
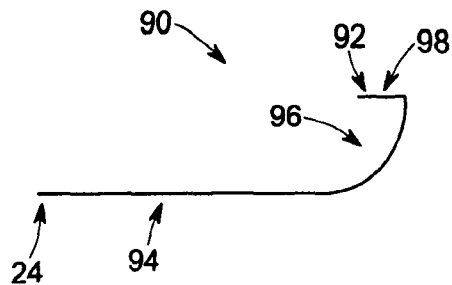
FIG. 5 illustrates a side view of a further embodiment of a wind turbine rotor blade in accordance with aspects of present subject matter.

Referring now to FIG. 5, another embodiment of a rotor blade 90 is illustrated in accordance with aspects of the present subject matter. As shown, the rotor blade 90 includes a root portion 24, a tip 92 and a body 94 extending between the root portion 24 and the tip 92. The body 94 of the rotor blade 90 may also define a suction side winglet 96 terminating at the tip 92 of the blade 90. Generally, the tip 92 of the suction side winglet 96 extends spanwise towards the center of rotation to form a combined curvy boxy planar C-shape winglet structure 96. The orientation of the lift in the spanwise extension/backwards section 98 is such that it counteracts the lift direction on the main rotor blade 90. The resulting reduction in out-of-plane thrust can advantageously be used to reduce structural weight of the blade 90, as stated herein. Additionally, the particular size and shape of the winglet 96 may generally vary depending on, for example, the size and shape of the rotor blade 80, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 96 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 90 of the present subject matter may be provided with the numerous performance advantages associated with a suction side winglet without increasing the likelihood that the rotor blade(s) 90 will strike the tower 10 during operation of the wind turbine 10.

Figure 6:
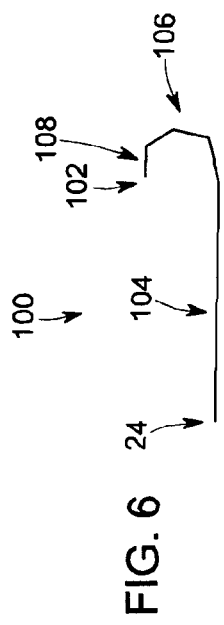
FIG. 6 illustrates a side view of still another embodiment of a wind turbine rotor blade in accordance with aspects of present subject matter.

Referring now to FIG. 6, another embodiment of a rotor blade 100 is illustrated in accordance with aspects of the present subject matter. As shown, the rotor blade 100 includes a root portion 24, a tip 102 and a body 104 extending between the root portion 24 and the tip 102. The body 104 of the rotor blade 100 may also define a suction side winglet 106 terminating at the tip 102 of the blade 100. Generally, the suction side winglet 106 extends spanwise towards the center of rotation to form a boxy curled planar C-shape winglet structure 106. The orientation of the lift in the spanwise extension/backwards section 108 is such that it counteracts the lift direction on the main rotor blade 100. The resulting reduction in out-of-plane thrust can advantageously be used to reduce structural weight of the blade 100, as stated herein. Additionally, the particular size and shape of the winglet 106 may generally vary depending on, for example, the size and shape of the rotor blade 100, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 106 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 100 of the present subject matter may be provided with the numerous performance advantages associated with a suction side winglet without increasing the likelihood that the rotor blade(s) 100 will strike the tower 10 during operation of the wind turbine 10.

Figure 7:
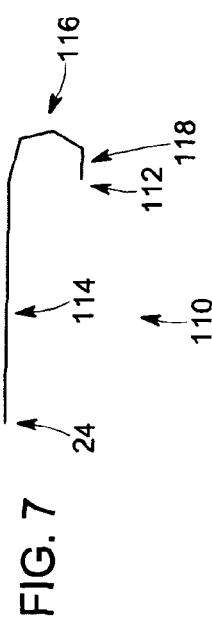
FIG. 7 illustrates a side view of still another embodiment of a wind turbine rotor blade in accordance with aspects of present subject matter.

Referring now to FIG. 7, another embodiment of a rotor blade 110 is illustrated in accordance with aspects of the present subject matter. As shown, the rotor blade 110 includes a root portion 24, a tip 112 and a body 114 extending between the root portion 24 and the tip 112. The body 114 of the rotor blade 110 may also define a pressure side winglet 116 terminating at the tip 102 of the blade 110. Generally, the pressure side winglet 116 extends spanwise 118 towards the center of rotation to form a curled boxy planar C-shape winglet structure 116. The benefit of reduced thrust loads is dominating for pressure side winglets. Additionally, the particular size and shape of the winglet 116 may generally vary depending on, for example, the size and shape of the rotor blade 110, the anticipated operating conditions of the wind turbine 10 and the desired performance of the wind turbine 10 to improve the aerodynamic efficiency and other performance-related parameters of an airfoil shaped body. Thus, the rotor blade 110 of the present subject matter may be provided with the numerous performance advantages associated with a suction side winglet without increasing the likelihood that the rotor blade(s) 110 will strike the tower 10 during operation of the wind turbine 10.

Figure 8:
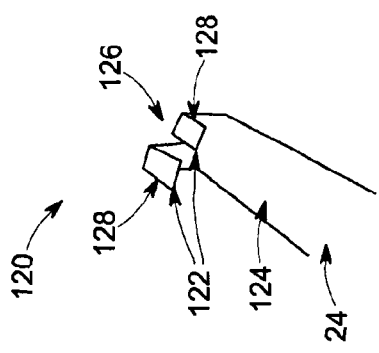
FIG. 8 illustrates a side view of still another embodiment of a wind turbine rotor blade in accordance with aspects of present subject matter.

Referring now to FIG. 8, another embodiment of a rotor blade 120 is illustrated in accordance with aspects of the present subject matter. As shown, the rotor blade 120 includes a root portion 24, a pair of tips 122 and a body 124 extending between the root portion 24 and the tip 122. The body 124 of the rotor blade 120 may also define a suction side winglet 126 terminating at the tip 122 of the blade 120. Generally, the suction side winglet 126 is a split winglet to enhance aerodynamic efficiency of the wind turbine blade 120, and extends spanwise towards the center of rotation to form a boxy planar C-shape split winglet structure 126. The orientation of the lift in the spanwise extension/backwards sections 128 is such that it counteracts the lift direction on the main rotor blade 120. The resulting reduction in out-of-plane thrust can advantageously be used to reduce structural weight of the blade 120, as stated herein. Additionally, the particular size and shape of the winglet 126 may generally vary depending on, for example, the size and shape of the rotor blade 120, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 126 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 120 of the present subject matter may be provided with the numerous performance advantages associated with a suction side winglet without increasing the likelihood that the rotor blade(s) 120 will strike the tower 10 during operation of the wind turbine 10.

Figure 9:
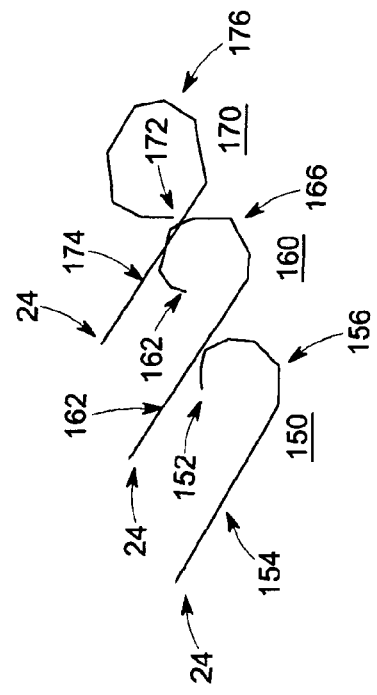
FIG. 9 illustrates a side view of still another embodiment of a wind turbine rotor blade in accordance with aspects of present subject matter.

Referring now to FIG. 9, another embodiment of a rotor blade 130 is illustrated in accordance with aspects of the present subject matter. As shown, the rotor blade 130 includes a root portion 24, a suction side tip 132, a pressure side tip 134, and a body 136 extending between the root portion 24 and the tips 132, 134. The body 136 of the rotor blade 130 may also define a suction side winglet 138 terminating at the tip 132 of the blade 130, and a pressure side winglet 140 terminating at the tip 134 of the blade 130. Generally, the suction side winglet 138 and the pressure side winglet 140 each extends spanwise towards the center of rotation to form a corresponding C-shape winglet structure. The orientation of the lift in the spanwise extension/backwards section 142 is such that it counteracts the lift direction on the main rotor blade 130. The orientation of the lift in the spanwise extension/backwards section 144 is such that it reduces thrust loading. The resulting reduction in out-of-plane thrust can advantageously be used to reduce structural weight of the blade 130, as stated herein. Additionally, the particular size and shape of the winglets 138, 140 may generally vary depending on, for example, the size and shape of the rotor blade 130, the anticipated operating conditions of the wind turbine 10 and the desired performance of the wind turbine 10 to improve the aerodynamic efficiency and other performance-related parameters of an airfoil shaped body.

Since the out-of-plane height projection of the winglet 130 is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 130 of the present subject matter may be provided with the numerous performance advantages associated with a suction side winglet without increasing the likelihood that the rotor blade(s) 130 will strike the tower 10 during operation of the wind turbine 10.

Figure 10:
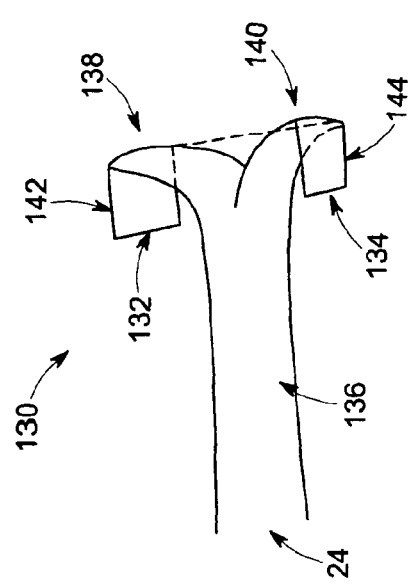
FIG. 10 illustrates a side view of still another embodiment of a wind turbine rotor blade in accordance with aspects of present subject matter.

Referring now to FIG. 10, various embodiments of rotor blades 150, 160, 170 are illustrated in accordance with aspects of the present subject matter. As shown, each rotor blade 150, 160, 170 includes a respective root portion 24, a tip 152, 162, 172 and a respective body 154, 164, 174 extending between the root portion 24 and the respective tip 152, 162, 172. The body of the each rotor blade may also define a respective suction side winglet 156, 166, 176 terminating at the respective tip 152, 162, 172 of the blade. Generally, each suction side winglet extends spanwise towards the center of rotation to form an open P-shape winglet structure. The orientation of the lift in the spanwise extension/backwards section is such that it counteracts the lift direction on the main rotor blade 150, 160, 170. The resulting reduction in out-of-plane thrust can advantageously be used to reduce structural weight of the blade, as stated herein. Additionally, the particular size and shape of the winglet 156, 166, 176 may generally vary depending on, for example, the size and shape of the rotor blade 150, 160, 170, the anticipated operating conditions of the wind turbine 10 and the desired performance of the wind turbine 10 to improve the aerodynamic efficiency and other performance-related parameters of an airfoil shaped body.

Since the out-of-plane height projection of the winglet is reduced, the predetermined tower clearance threshold 40 for the wind turbine 10 is more easily maintained which improves the situation with respect to tower-strike/tip clearance issues for the case of a suction side winglet, as stated herein. Thus, the rotor blade 150, 160, 170 of the present subject matter may be provided with the numerous performance advantages associated with a suction side winglet without increasing the likelihood that the rotor blade(s) 150, 160, 170 will strike the tower 10 during operation of the wind turbine 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotor blade for a wind turbine, the rotor blade comprising:
   a center of rotation;
   a root portion;
   a tip; and
   a body extending between said root portion and said tip, the body comprising a pressure side, a suction side, a plane, and at least one winglet, each winglet comprising a spanwise extension extending towards the root portion or center of rotation of the rotor blade and further extending towards the plane of the rotor blade and ending at the tip of the rotor blade.

2. The rotor blade according to claim 1, wherein at least one winglet comprises a substantially C-shaped geometry.

3. The rotor blade according to claim 1, wherein at least one winglet comprises a substantially open P-shaped geometry.

4. The rotor blade according to claim 1, wherein at least one winglet comprises a suction side winglet.

5. The rotor blade according to claim 1, wherein at least one winglet comprises a pressure side winglet.

6. The rotor blade according to claim 1, wherein the at least one winglet comprises a suction side winglet and a pressure side winglet.

7. The rotor blade according to claim 1, wherein at least one winglet comprises a smoothly curved geometry.

8. The rotor blade according to claim 1, wherein at least one winglet comprises a boxy planar geometry.

9. The rotor blade according to claim 1, wherein at least one winglet comprises both a curved geometry and a boxy planar geometry.

10. The rotor blade according to claim 1, wherein at least one winglet comprises a chord-split geometry.

11. The rotor blade according to claim 1, wherein the spanwise extension towards the plane of the rotor blade comprises a cant angle more than 90 degrees.

12. A wind turbine comprising:
    a center of rotation;
    a tower;
    a nacelle mounted atop the tower;
    a rotor coupled to said nacelle, the rotor comprising a hub; and
    at least one rotor blade extending from the hub, each rotor blade comprising:
       a center of rotation;
       a root portion;
       a tip; and
       a body extending between said root portion and said tip, the body comprising a pressure side, a suction side, a plane, and at least one winglet, each winglet comprising a spanwise extension extending towards the root portion or center of rotation of the rotor blade and further extending towards the rotor blade and ending at the tip of the rotor blade.

13. The wind turbine according to claim 12, wherein at least one winglet comprises a substantially C-shaped geometry.

14. The wind turbine according to claim 12, wherein at least one winglet comprises a substantially open P-shaped geometry.

15. The wind turbine according to claim 12, wherein at least one winglet comprises a suction side winglet.

16. The wind turbine according to claim 12, wherein at least one winglet comprises a pressure side winglet.

17. The wind turbine according to claim 12, wherein the at least one winglet comprises a suction side winglet and a pressure side winglet.

18. The wind turbine according to claim 12, wherein at least one winglet comprises a smoothly curved geometry.

19. The wind turbine according to claim 12, wherein at least one winglet comprises a boxy planar geometry.

20. The wind turbine according to claim 12, wherein at least one winglet comprises both a curved geometry and a boxy planar geometry.

21. The wind turbine according to claim 12, wherein at least one winglet comprises a chord-split geometry.

22. The wind turbine according to claim 12, wherein the spanwise extension towards the rotor blade comprises a cant angle more than 90 degrees.

* * * * *